United States Patent [19]

Miller, Jr. et al.

[11] Patent Number: 4,689,259

[45] **Date of Patent: * Aug. 25, 1987**

[54] FLOOR TILE PRODUCT AND PROCESS

[75] Inventors: Jesse D. Miller, Jr., Lancaster; James A. Tshudy, Ephrata; Ralph E. Unruh, Denver, all of Pa.

[73] Assignee: Armstrong World Industries, Inc., Lancaster, Pa.

[ * ] Notice: The portion of the term of this patent subsequent to Sep. 7, 1999 has been disclaimed.

[21] Appl. No.: 643,536

[22] Filed: Aug. 23, 1984

Related U.S. Application Data

[63] Continuation of Ser. No. 427,517, Sep. 29, 1982, abandoned.

[51] Int. Cl.[4] .......................... B32B 5/16; B32B 3/26

[52] U.S. Cl. .................................. 428/142; 428/149; 428/143; 428/161

[58] Field of Search .............. 428/142, 143, 161, 172, 428/156, 204, 206, 212, 149

[56] References Cited

U.S. PATENT DOCUMENTS

| | | | |
|---|---|---|---|
| 2,455,777 | 12/1948 | Jones | 428/204 |
| 3,328,231 | 6/1967 | Sergovic | 428/331 |
| 3,377,184 | 4/1968 | Kukoff | 428/206 |
| 3,908,059 | 9/1975 | Prince | 428/206 |
| 3,951,714 | 4/1976 | Franco | 428/206 |
| 4,126,727 | 11/1978 | Kaminski | 428/204 X |
| 4,172,169 | 10/1979 | Mawson et al. | 428/161 X |
| 4,196,243 | 4/1980 | Sachs et al. | 428/206 |
| 4,348,447 | 9/1982 | Miller, Jr. et al. | 428/143 X |
| 4,418,109 | 11/1983 | Miller, Jr. et al. | 428/143 X |

*Primary Examiner*—Nancy A. Swisher

[57] ABSTRACT

A decorative floor covering in tile form has a design printed on its upper surface. Particles are positioned on the upper surface of the tile with at least some of the particles being placed on the tile surface in register with the design printed on the tile surface. A cured wear layer overlies both the particle and the plastic base, whereby the wear layer surface in the areas containing particles and in the areas not containing particles will be of different gloss characteristics.

The process requires the sprinkling of particles over an adhesive coated surface to retain the particles in registration with a printed design on the tile surface.

5 Claims, 1 Drawing Figure

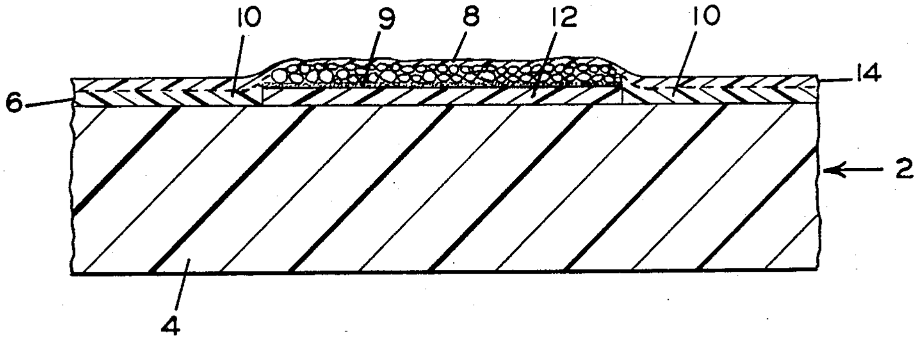
10
9
8
12
10
14
6
2
4

FLOOR TILE PRODUCT AND PROCESS

CROSS REFERENCE TO RELATED APPLICATION

This is a continuation of application Ser. No. 427,517, filed Sept. 29, 1982 now abandoned.

BACKGROUND OF THE INVENTION

1. Field of the Invention

This invention is related to a decorative plastic floor tile and its method of manufacture.

2. Description of the Prior Art

It is known in the prior art to provide, where desirable, wear resistant layers. Commercial tile has been made with a non-skid surface made by heating individual pieces of ordinary vinyl tile and spraying the surfaces with carborundum grit. One then embeds the grit into the surface of the tile, the grit particles imparting the non-skid characteristic to the tile. It is also known from the prior art to provide a slip resistant surface by providing the plastic flooring product with a nubbly texture by incorporating particulate plastic material dispersed in the wear layer which is cured to form a textured wear layer. This latter feature is disclosed in U.S. Pat. No. 4,196,243.

U.S. Pat. No. 3,267,187 discloses a textured floor covering comprising a base layer, a plastic layer, and an overlying matrix containing particulate material embedded therein.

U.S. Pat. No. 4,196,243 teaches that it is old in the art to apply wear layers onto floor coverings, and particularly a non-skid photopolymerizable urethane layer.

U.S. Pat. No. 3,928,706 discloses the use of hard quartz particles.

Application Ser. No. 237,666, entitled "Non-Skid Plastic Flooring Product and Method of Manufacture," filed Feb. 24, 1981, in the name of Jesse D. Miller, Jr., et al., commonly assigned with this application, now U.S. Pat. No. 4,348,447 discloses a non-skid decorative plastic floor covering composed of a decorative plastic base having a plurality of slip-resistant elements positioned on the base with a clear or translucent wear layer overlying the slip-resistant elements and the exposed intervening base.

There has also been made a decorative plastic floor covering with a decorative plastic base having raised and depressed areas. A plurality of elements are positioned on the raised areas only and then thereover a cured clear or translucent wear layer overlies both the elements and the plastic base. The elements comprise particles embedded in a cured plastic matrix which is positioned only on the raised areas of the base. The particles are distributed on the plastic matrix in a substantially abutting relationship with a single layer of particles. The particles protrude above the matrix, but are below the uppermost level of the wear layer. The particles are rounded inorganic particles of quartz and have a Moh hardness greater than 4. The particles are distributed on the raised area of the base, such that none of the particles are greater than about 595 microns, with about 55% of the particles being about 149 to 296 microns in size. The wear layer is a cured urethane composition.

U.S. Pat. No. 3,343,975 discloses the application of granules to a printed vinyl type substrate, but in all cases, the granules are not of an aggregate composition but were instead of resinous composition.

U.S. Pat. No. 4,126,727 discloses the concept of providing a resinous, polymer material with a pattern printed thereon. A wear layer is then bonded to the patterned sheet, and the wear layer contains mica chips or chips of similar material. The chips are embedded in a separate preformed sheet which is then laminated to the pattern layer.

U.S. Pat. No. 3,328,231 discloses the formation of a surface from a hardened cured composition of a polyester, or similar polymerizable resin, and sand.

U.S. Pat. Nos. 4,255,480 and 4,263,081 disclose an abrasive resistant laminate formed by coating a printed paper base with minerial particles and then impregnating the paper with a laminating resin.

U.S. Pat. Nos. 3,121,642; 3,135,643; 3,343,975; 3,523,849; 3,562,051; 3,607,539; 3,660,187; 3,661,673; 3,798,111; 4,212,691 and 4,278,483 are other patents which disclose other methods for forming wear or abrasive resistant surfaces and are indicative of the art.

SUMMARY OF THE INVENTION

A decorative plastic floor covering in tile form is provided with a decorative plastic base having on the upper surface thereof a design printed thereon. Particles positioned on the upper surface of the tile are so positioned that at least some of the particles are placed on the tile surface in registration with the design printed on the tile surface. A cured clear or translucent wear layer overlies both the particles and the plastic base whereby the wear layer surface in the areas containing particles and in the areas not containing particles will be of different gloss characteristics. The particles are rounded particles of sand, having a Moh hardness of about 7 and a particle size distribution such that none are greater than about 595 microns and about 55% of the particles are between 149 and 296 microns.

A method is provided for making a tile product. First a design is printed on the upper surface of the tile. An adhesive coating is placed in registration to selected portions of the printed tile design. Sand particles are sprinkled over the adhesive coated tile surface. One then removes the excess sand particles not retained on the tile surface by the adhesive. The sand particles are consolidated into the adhesive and then the adhesive may be cured. There is then applied a wear coating over top of both areas covered by the sand particles and areas not covered by the sand particles and this wear layer is cured. There is then provided a wear surface with areas of differential gloss where the sand particles exist and where the sand particles do not exist.

BRIEF DESCRIPTION OF THE DRAWING

The FIGURE of the drawing is an enlarged cross-sectional view of the tile base containing the printed design, the adhesive, sand particles, and a wear layer.

DESCRIPTION OF THE PREFERRED EMBODIMENT

The invention is directed to a flooring product which is primarily a durable low-maintenance floor tile but which, more importantly, possesses unique visual characteristics. The invention outlined below results in a particularly good technique for achieving unexpectedly realistic ceramic-like images on vinyl composition flooring materials. Decorative ceramic tile images in vinyl floors are typically simulated by rotogravure printing a substrate, overcoating with wear layer material of either vinyl or urethane compositions, and embossing to provide textures and surface relief. Although these flooring materials can be very appealing and attractive, they have the traditional wear properties of vinyl floor and tend to be visually flat and one-dimensional. Further, they do not possess the many visual characteristics, both subtle and otherwise, generally associated with real ceramic tile.

The invention herein provides a structure and a process for achieving many of the characteristics of ceramic tile while, at the same time, offering outstanding performance properties. The basic process involves the application of particulate matter of specific size and color onto a decorative flooring substrate followed by the application of a UV curable wear layer. A number of variations have been carried out and are described briefly below. The particulate can be a variety of materials. Silica, either clear or colored, is preferred, although other material such as garnet, aluminum oxide, etc., can and have been experimented with. The decorative floor substrate is a printed vinyl composition and the decoration was done preferably by transfer printing with a rotogravure-printed transfer paper or by flexograph printing directly onto the substrate. The particulate matter is positioned in register with the printed side in several ways.

For a substrate that has been transfer printed or flexographically printed, or decorated by some other printing technique, the UV curable adhesive material is applied in register with the printed design. The adhesive can be applied by screen printing, flexographic printing, etc. The selected particulate is then applied to the printed substrate with its adhesive by flooding the entire surface and removing that which does not stick to the adhesive. The quantity of particulate material that adheres to the tile can be controlled by the amount of adhesive that is applied. The retained particulate layer is then smoothed and consolidated by passing the material through a pair of rolls. The adhesive is then cured. An overcoat of UV-curable material (wear layer) is then applied by roll coating and/or curtain coating to provide a smooth functional surface. Multiple passes through a process are possible and desirable. A variety of colors and/or particulate sizes can be applied to the printed substrate to provide a broad capability for unique designs.

It is also possible to apply the adhesive and decorate the substrate simultaneously. For example, a smooth or embossed undecorated surface can be flexographically printed with the UV curable pigmented adhesive which serves both to decorate and hold the particulate materials. Another option is to uniformly apply a particulate material over the entire surface of a decorated substrate followed by a second particulate application on top of the previously applied layer in register with a design. Such a structure provides even better wear characteristics than those with only a partially covered surface.

Some of the advantages of the invention herein is that a surface relief or an embossing-in-register effect with a decoration can be accomplished. The variable surface textures and the variable surface glosses are both controllable. The product can be provided with good wearing properties and many visuals are possible.

Referring now to the drawing, the decorative plastic floor covering tile 2 comprises a plastic base 4 which is composed of a conventional vinyl or vinyl composition tile material. Normally, the tile product is 9"×9" square and has a nominal thickness of 0.096". A design 6 is applied to the upper surface of the tile. Particles 8 are then placed on the upper surface of the tile, and at least some of the particles are placed on the tile surface in registration with the design printed on the tile surface. In the structure shown in the drawing, the design 6 is composed of two components 10 and a third component 12 which is different in design/color from the two components 10. The particles are applied in register with the component 12 of the design. Over the top surface of the tile covering both the areas containing particles and the areas not containing particles, there is provided a clear or translucent wear layer 14. It is noted that those areas containing particles have a different gloss characteristic than those areas which do not contain particles. Consequently, that means that the area above the printed design component 10 will have a different gloss characteristic than the area above printed design component 12.

The particles 8 which are applied to the top surface of the tile are rounded particles of sand which have a Moh hardness of about 7 and a particle size distribution such that none are greater than about 595 microns, and about 55 percent of the particles are between 149 and 196 microns. The particles are commercially available as the "Special Bond" grade of sand which is offered by the Ottawa Silica Co. of Ottawa, Ill. The sand is 99.8% $SiO_2$ and may be a natural color, or it is possible that the sand could be colored to provide a colored effect to the end product.

Typical U.S. sieve analysis of the inorganic silica particles is as follows:

| U. S. Sieve Size (Mesh) | Size of Openings | Percent Retained |
|---|---|---|
| Screen 30 | 595 microns | — |
| Screen 40 | 420 microns | 3.0 |
| Screen 50 | 296 microns | 34.0 |
| Screen 70 | 210 microns | 39.0 |
| Screen 100 | 149 microns | 18.0 |
| Screen 140 | 105 microns | 5.0 |
| Screen Pan | | 1.0 |

The adhesive coating used is as follows. To form the polyester adhesive, the following ingredients were charged to a 5 liter, 5-necked flask condenser (upright) with still head and total condenser above. The flask was further equipped with mantle, stirrer, thermometer, temperature controls and gas inlet tube. The ingredients were heated gradually with stirring to 220°±5° C. under nitrogen and held at this temperature until the acid number fell below 1.5±0.5. The nitrogen flow was gradually increased after about 70 percent of the theoretical water was obtained to about 700 ml per minute to help remove the water of esterification and drive the reversible equilibrium reaction to completion.

| Ingredients | Parts by Weight |
|---|---|
| 1,6-Hexanediol | 363.52 |
| Neopentyl Glycol | 661.25 |
| Cyclohexanediomethanol | 914.13 |
| Phthalic Anhydride | 563.81 |
| Dibutyltin bis Lauryl Mercaptide Catalyst | 2.48 |
| Isophthalic Acid | 1476.24 |
| Silicone Antifoam (Foamkill 8R) | 0.0566 |
| Toluene | 650.00 |

Acrylation of the polyester is carried out by charging 1.2 equivalents of acrylic acid to an appropriately sized 4-necked flask containing the polyester-solvent mixture. Sulfuric acid (0.24 parts per hundred parts resin) is added and the mixture held at reflux with a Barrett trap used to remove the water and return the solvent.

The batch temperature is held at 95° to 110° C. The reaction was terminated when between 90 and 98 percent of the theoretical water was obtained by cooling to 90° C. and adding 1.3 equivalents of magnesium oxide dispersed in 100 parts by weight isodecyl acrylate with an additional 600 parts by weight of isodecyl acrylate also added. The flask was then evacuated to 40 to 50 mm of mercury to remove solvent. Addition with agitation of 73.14 parts by weight 1,6-hexane-diol diacrylate, 104.5 parts by weight acrylic acid, 100 parts by weight isodecyl acrylate, 104.5 parts by weight benzophenone and 62.7 parts by weight catalyst 2,2-dimethoxy-2-phenylacetophenone (Irgacure 651) completes the curable adhesive preparation. This adhesive 9 is printed on the design 6 in registration with components of the design.

Positioned in this adhesive 9 are particles 8 which are preferably rounded inorganic particles. The inorganic particles useful in the practice of the invention to form the wear surface are preferably substantially insoluble in water and have a Moh hardness of at least 4 and preferably at least 7. They must be of a rounded configuration and preferably have a particle size distribution wherein none of the particles are greater than about 595 microns and about 55% of the particles are between 149 and 296 microns in size.

To prepare the UV curable coating 14, the following reactants were charged into a reaction vessel:

| Ingredients | Parts by Weight |
|---|---|
| Polyester polyol* | 36.15 |
| 2 Ethylhexyl acrylate | 13.33 |
| 1,6 Hexanediol diacrylate | 9.07 |

*Reaction product of 34.62 parts by weight adipic acid, 13.12 parts by weight isophthalic acid, 48.76 parts by weight 1,6 hexanediol and 3.48 parts by weight glycerine 23.10 parts by weight of 4,4'diisocyanato dicyclohexylmethane and 0.08 parts by weight of dibutyltin dilaurate catalyst were then added and the mixture reacted at 45° C. to 50° C. After the reaction has proceeded for approximately 45 minutes, 8.67 parts by weight of 2-hydroxyethylacrylate was added and heating and stirring of the reaction mixture continued for two hours at which point the isocyanate functionally is constant.

To this reaction product is then added 1.81 parts by weight benzophenone, 0.90 parts by weight 2,2-dimethoxy-2-phenylacetophenone, 6.78 parts by weight paracresol antioxidant and 0.09 parts by weight glycolpolysiloxane (DC-193). This coating could be used also as the adhesive coating.

The process for carrying out the manufacture of the above tile product requires first the preparation of a conventional tile base. Also, there is prepared a transfer sheet containing a printed design thereon which it is desired to transfer to the tile base. By an appropriate transfer printing operation which is conventional in the art, the transfer paper is placed up against the top surface of the tile base and through heat and pressure, the image from the transfer sheet is transferred to the tile base. The tile base is now fed past a printing unit such as a conventional direct flexographic printer and an adhesive coating is applied in register with the tile base design. This adhesive coating is only applied to select areas of the tile product and these areas that are printed are in register with the design printed on the tile base. Though it would be possible, as described above, to overall print with an adhesive to put a first layer of particles on and then, subsequently, follow with a second adhesive coating which would be in coordination with the tile design to then only partially cover the total tile surface with a second particulate material.

After the adhesive has been placed in register with the design on the tile, one then cascades or sprinkles an excess of a mixture of clear or artificially colored sand particles onto the surface of the tile base with its uncured adhesive layer. This uncured adhesive layer is the previously described polyester curable adhesive. These sand particles will adhere to the adhesive without special treatment. The excess sand is removed with air jets, and then through a roll pressing operation, the sand particles are consolidated into the adhesive. The tile is then conveyed under a conventional UV light source and exposed to an amount of radiation sufficient to partially cure or completely cure the UV adhesive and hold the particles in place. The product now has adhered to its surface an adhesive which was applied at the rate of 1.0 to 3.5 grams of material per square foot of tile surface covered. This is then provided with a layer of particulate material which is applied at the rate of about 15 grams per square foot covered and which is of a thickness in the range of 10 mils to 15 mils.

The wear coat is now applied to the tile product as two layers. The wear coat is the previously described UV curable coating. It is first applied using a conventional forward roll coater that applies the first coat layer at about 130° F. with about 10 gram per square foot application rate. This coating fills in the space around the laid up sand and is done with a minimum of large bubbles being formed in the coating. A second layer of the same coating material is then applied at the rate of about 10 grams per square foot using conventional curtain coating techniques. Both layers are then cured using conventional UV light. Typical of the energy dosage that could be used at this point is a treatment of UV light at 4.5 joules UV energy. There is now provided a tile product which is particularly unique from the point of view that those areas with the sand particles are of a differential gloss from those areas where the sand particles do not exist.

What is claimed is:

1. A decorative plastic floor covering in tile form comprising a decorative plastic base having on the flat upper surface thereof a design printed at least in part thereon, rounded particles positioned on the upper surface of the tile with at least some of the particles placed on the tile surface in register with at least part of the design formed on the tile surface, a cured clear of transparent wear layer means overlying both the particles and the plastic base without particles, said wear layer means in the areas not containing particles providing a flat surface having a first gloss characteristic and in the areas containing particles, providing an irregular surface having a second different gloss characteristic.

2. The decorative plastic floor covering of claim 1 wherein the particles are rounded particles of sand having a Moh hardness of about 7 and a particle size distribution such that none are greater than about 595 microns, and about 55% of the particles are between 149 and 296 microns.

3. A decorative plastic floor covering in tile form comprising a first layer which is a plastic base having an upper flat surface, on the upper surface of the plastic base there being provided a second layer which is a printed design on at least part of the upper surface, a third layer being provided in part on, but not on all, the design area in register with a portion of the design, said third layer being a layer of adhesive, in those selected areas where there is a layer of adhesive, a fourth layer is provided, said fourth layer being a layer of particles, and over the areas containing the particles and the areas containing the printed design and no particles there being provided a clear final layer which will coat both the particles and the printed design, said decorative plastic floor then having a structure wherein some portion of the structure has particles thereon, and a first gloss characteristic for the wear layer and, other portions of the structure do not have particles thereon on the upper surface of the plastic base and therefore a second different gloss characteristic for the wear layer so that the construction of the plastic floor covering in the areas not containing the particles will be a three-layer structure of the plastic base, the printed design and the wear layer whereas in the areas containing the particles, there will be a five-layer construction consisting of the plastic base, the printed design, the adhesive coating in register with some portion of the printed design, a particle layer in register with the adhesive and then a final layer which will be a wear layer.

4. A decorative plastic floor covering as set forth in claim 3 wherein an additional layer of the same material is positioned on top of the particles prior to the time that the final wear layer coat is placed on the decorative plastic floor covering.

5. A decorative plastic floor covering as set forth in claim 3 wherein the particles are round particles of sand having a Moh hardness of about 7 and a particle size distribution such that none are greater than about 590 microns, and about 55% of the particles are between 149 and 296 microns.

* * * * *